(12) United States Patent
Tominaga et al.

(10) Patent No.: US 7,114,846 B2
(45) Date of Patent: Oct. 3, 2006

(54) TWO-COLOR RADIATION THERMOMETER

(75) Inventors: Hideki Tominaga, Uji (JP); Kunihiko Ohkubo, Moriyama (JP); Yasushi Kondo, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 10/815,922

(22) Filed: Apr. 2, 2004

(65) Prior Publication Data

US 2004/0208223 A1      Oct. 21, 2004

(30) Foreign Application Priority Data

Apr. 18, 2003   (JP)   ............... 2003-113761

(51) Int. Cl.
*G01J 5/08*   (2006.01)
*G01J 5/02*   (2006.01)
*G01K 1/02*   (2006.01)
*H01L 31/0232*   (2006.01)

(52) U.S. Cl. .............. 374/121; 374/120; 250/330; 250/338.1; 250/336.1; 250/339.02

(58) Field of Classification Search ............... 374/120, 374/121, 130, 131, 132, 208; 250/330, 336.1, 250/338.1, 338.3, 339.02, 339.06, 339.11, 250/341.3, 341.8
See application file for complete search history.

(56) References Cited

U.S. PATENT DOCUMENTS

| 4,651,001 A | * | 3/1987 | Harada et al. ............... 250/330 |
| 4,659,234 A | * | 4/1987 | Brouwer et al. ............ 374/121 |
| 4,751,571 A | * | 6/1988 | Lillquist ..................... 348/164 |
| 4,755,673 A | * | 7/1988 | Pollack et al. .............. 250/330 |
| 4,967,276 A | * | 10/1990 | Murakami et al. .......... 348/164 |
| 5,216,252 A | * | 6/1993 | Boone et al. ............ 250/486.1 |
| 5,219,226 A | * | 6/1993 | James ........................ 374/124 |

(Continued)

FOREIGN PATENT DOCUMENTS

JP    07246185 A   *  9/1995

(Continued)

*Primary Examiner*—Gail Verbitsky
(74) *Attorney, Agent, or Firm*—Manabu Kanesaka

(57) ABSTRACT

A two-color radiation thermometer includes an image pickup device having micro photo receiving units arranged two-dimensionally; a light diverging device for diverging incident light coming from a measuring object into two paths and irradiating the light on two different areas on a two-dimensional light receiving surface of the image pickup device; a wavelength limitation device for limiting wavelengths of the light irradiated on the two different areas to first and second wavelengths, respectively; and a temperature calculation device. The calculation device receives image signals corresponding to the first and second wavelengths respectively from the micro photo receiving units located at the two different areas, and calculates the temperature of the measuring object based on the two image signals.

4 Claims, 4 Drawing Sheets

U.S. PATENT DOCUMENTS

| | | | | |
|---|---|---|---|---|
| 5,656,813 A | * | 8/1997 | Moore et al. | 250/330 |
| 5,686,889 A | * | 11/1997 | Hillis | 340/540 |
| 5,910,816 A | * | 6/1999 | Fontenot et al. | 348/65 |
| 6,009,340 A | * | 12/1999 | Hsia | 600/407 |
| 6,121,616 A | * | 9/2000 | Trigg | 250/339.07 |
| 6,393,056 B1 | * | 5/2002 | Talluri et al. | 375/240 |
| 6,640,130 B1 | * | 10/2003 | Freeman et al. | 600/474 |
| 6,682,216 B1 | * | 1/2004 | Small, IV et al. | 374/126 |
| 6,814,484 B1 | * | 11/2004 | Yano et al. | 374/121 |
| 6,969,856 B1 | * | 11/2005 | Hillenbrand et al. | 250/332 |
| 2002/0030163 A1 | * | 3/2002 | Zhang | 250/330 |
| 2002/0186304 A1 | * | 12/2002 | Kono et al. | 348/216.1 |
| 2002/0186976 A1 | * | 12/2002 | Seo | 396/429 |
| 2003/0108083 A1 | * | 6/2003 | Seitz | 374/120 |
| 2003/0173518 A1 | * | 9/2003 | Ozaki | 250/330 |
| 2003/0227680 A1 | * | 12/2003 | Chen et al. | 359/498 |
| 2004/0208230 A1 | * | 10/2004 | Lee et al. | 374/208 |
| 2005/0265423 A1 | * | 12/2005 | Mahowald et al. | 374/121 |

FOREIGN PATENT DOCUMENTS

| | | | |
|---|---|---|---|
| JP | 2002303553 A | * | 10/2002 |
| JP | 2003-315159 | | 11/2003 |
| JP | 2005229317 A | * | 8/2005 |

* cited by examiner

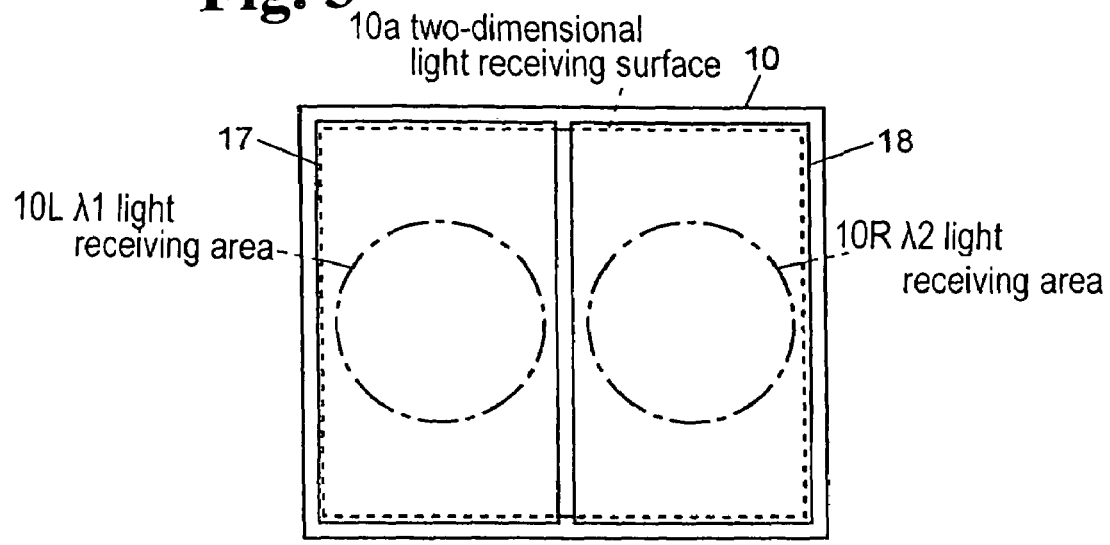
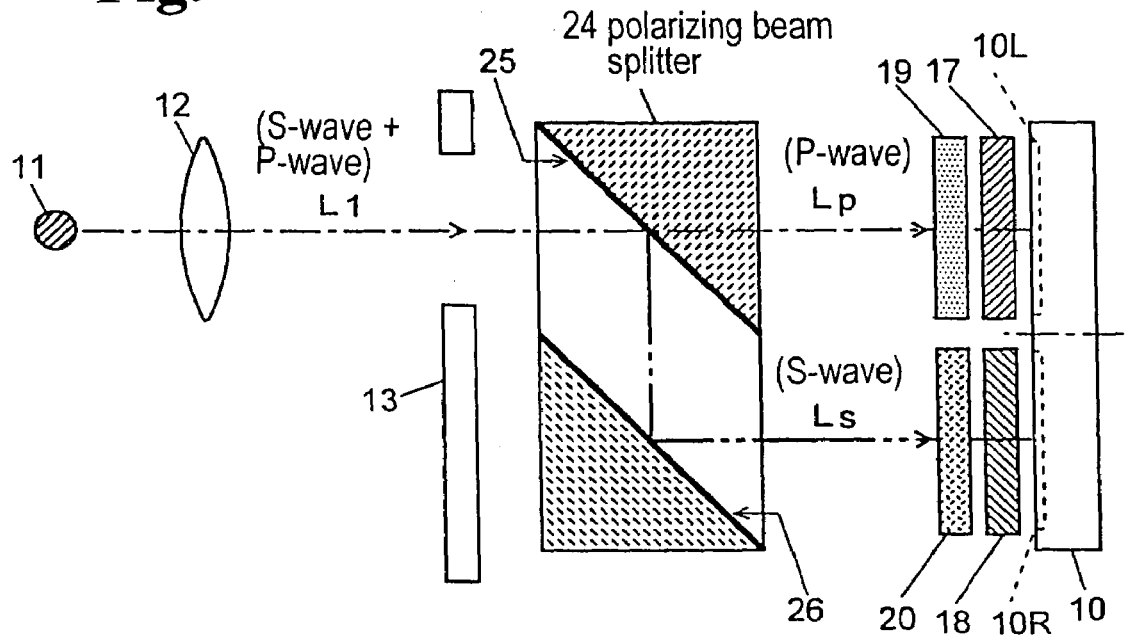

TWO-COLOR RADIATION THERMOMETER

BACKGROUND OF THE INVENTION AND RELATED ART STATEMENT

The present invention relates to a two-color radiation thermometer for measuring a temperature of an object in a non-contact mode using thermal radiation from the object.

A two-color radiation thermometer (two-wavelength radiation thermometer) has been used for measuring a temperature of, for example, combustion or explosion inside a blast furnace in a non-contact mode (refer to Japanese Patent Publication (Kokai) No. 07-253361). Particularly, when a measuring object has a two-dimensional surface, a two-color radiation thermometer with a CCD camera is useful (refer to Japanese Patent Publication (Kokai) No. 2002-309307). In such a two-color radiation thermometer, the CCD camera captures an image of a measuring surface using two different wavelengths, so that it is possible to calculate a two-dimensional temperature distribution of the measuring surface based on a difference of two images in brightness information.

In such a tow-color radiation thermometer, as a method of obtaining images corresponding to two wavelengths, there has been a method in which two CCD cameras independently receive light separated by a wavelength selective prism (two-plate system). As disclosed in Japanese Patent Publication (Kokai) No. 2002-309307, there has been another method in which a RGB filter, ordinarily used as a CCD sensor for regular color photography, is provided for selecting a wavelength without an optical device such as a prism (single-plate system).

In the two-plate system, it is possible to freely select a measuring wavelength through changing the prism or the wavelength selective filter. However, it is necessary to provide two CCD cameras, thereby making the device complicated and increasing cost. On the other hand, in the single-plate system, it is possible to make the device simple and reduce cost. However, since the CCD sensor for regular color photography is used, it is difficult to select a measuring wavelength other than the three wavelengths, i.e. red, green, and blue (RGB). Accordingly, it is difficult to measure an accurate temperature depending on a color of light (wavelength) emitted from a measuring object.

In view of the problems described above, the present invention has been made, and an object of the present invention is to provide a two-color radiation thermometer capable of freely and easily selecting a measuring wavelength with a simple configuration such as the single-plate system.

Further objects and advantages of the invention will be apparent from the following description of the invention.

SUMMARY OF INVENTION

In order to attain the objects described above, according to the present invention, a two-color radiation thermometer includes an image pickup device having micro photo receiving units arranged two-dimensionally; a light diverging device for diverging incident light coming from a measuring object into two paths and irradiating the light on two different areas on a two-dimensional light receiving surface of the image pickup device; a wavelength limitation device for limiting wavelengths of the light irradiated on the two different areas to first and second wavelengths, respectively; and a temperature calculation device for receiving image signals corresponding to the first and second wavelengths respectively from the micro photo acceptance units located at the two different areas and for calculating the temperature of the measuring object based on the two image signals.

The image pickup device includes a CCD type or CMOS type image sensor. The light diverging device includes a prism, and may include a device such as a polarizing beam splitter in which the light is diverged according to a polarized component. The wavelength limitation device includes a filter with wavelength selectivity. Each of the constitution elements may be a device other than the above-described elements.

In the two-color radiation thermometer of the present invention, the light thermally radiated from the measuring object is diverged in two paths via the light diverging device. The light diverged via the wavelength limitation device in one of the two paths is limited to have the first wavelength component, and the light in the other of the two paths is limited to have only the second wavelength component. The light is irradiated to the two different areas not overlapping on the two-dimensional light receiving surface of the image pickup device as monochromatic light. Accordingly, the light forms identical images of the measuring object with different wavelengths on the two different areas. The temperature calculation device receives image signals of the images from the micro photo receiving units located at the two different areas, and the temperature of the measuring object is calculated, for example, from the difference in light brightness according to the two images, that is, the image corresponding to the first wavelength and the image corresponding to the second wavelength.

In the two-color radiation thermometer of the present invention, a single (only one) image pickup device is provided, thereby making the device simple, and reducing a size of the device and cost. Furthermore, it is possible to change the measuring wavelength only through changing the wavelength limitation device such as a wavelength selective filter. Accordingly, it is easy to select the measuring wavelength according to the measuring object.

In the present invention, the image pickup device includes an ordinary device for sequentially reading out a pixel signal obtained at each of the micro photo acceptance units. It is preferred that the image pickup device is arranged such that it is possible to read out the pixel signals from the micro photo acceptance units located at areas at both sides of a borderline between the two different areas in parallel (two systems).

With this arrangement, it is possible to perform data processing such as, for example,. differentiating the two images at a high speed, while reading out the pixel signals corresponding to the two images. Therefore, it is suitable for measuring a two-dimensional temperature distribution of a phenomenon such as, for example, an explosion or combustion at a high speed.

BRIEF DESCRIPTION OF THE DRAWINGS

FIG. 3 is a front view of a light receiving surface of a CCD image sensor shown in FIG. 2;

FIG. 4 is a schematic view showing a light path in an image pickup unit of a two-color radiation thermometer according to another embodiment of the present invention.

DETAILED DESCRIPTION OF PREFERRED EMBODIMENTS

Figure 1:
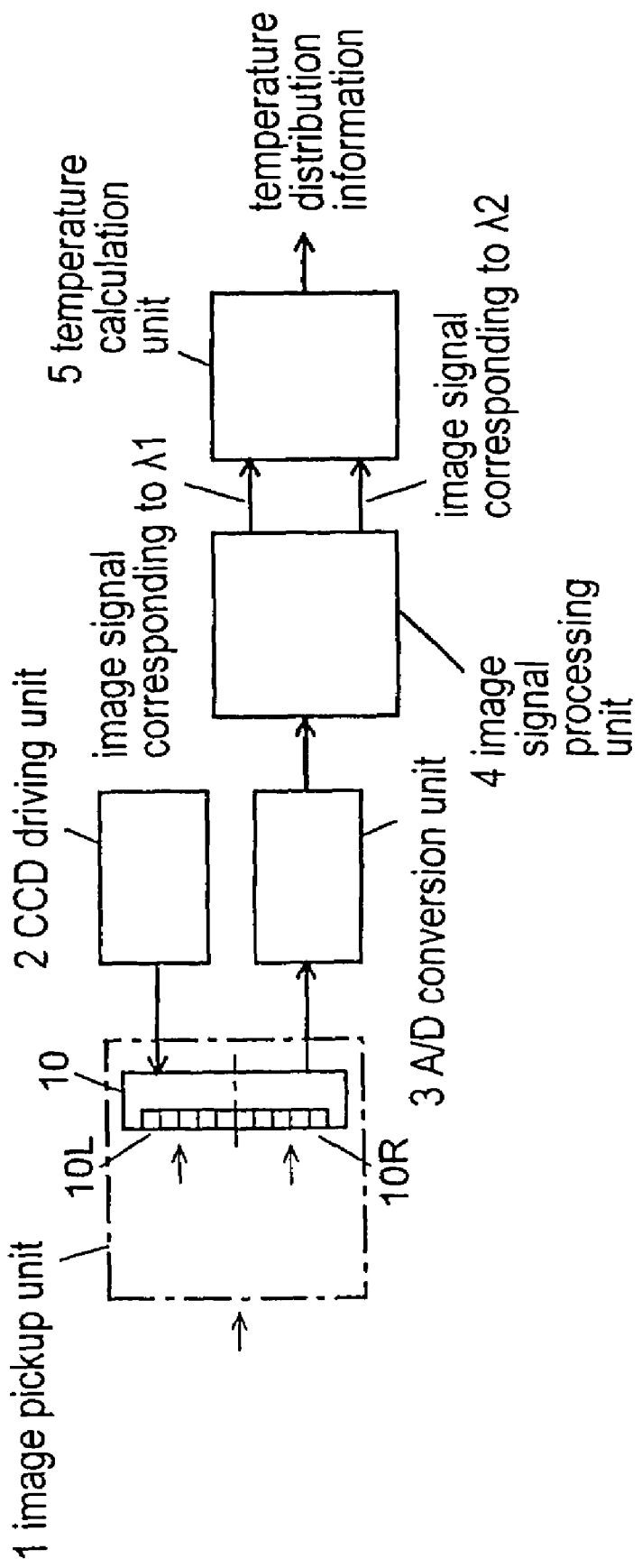
FIG. 1 is a diagram showing an overall structure of a two-color radiation thermometer according to an embodiment of the present invention.
Figure 2:
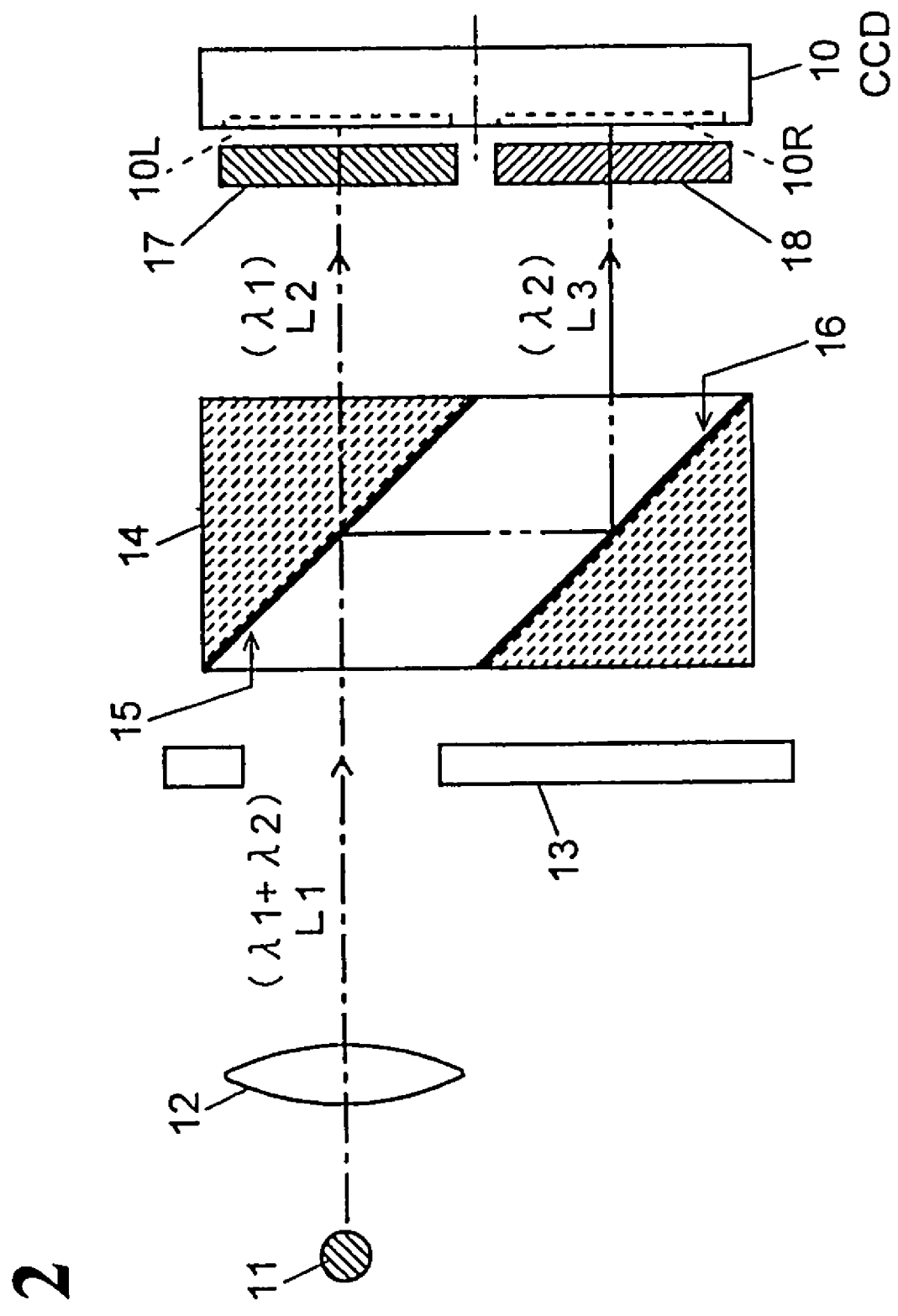
FIG. 2 is a schematic view-showing a light path in an image pickup unit shown in FIG. 1.

Hereunder, embodiments of the invention will be explained with reference to FIGS. 1–3. FIG. 1 is a diagram showing an overall structure of a two-color radiation thermometer according to an embodiment of the present invention. FIG. 2 is a schematic view showing a light path in an image pickup unit shown in FIG. 1. FIG. 3 is a front view of a light receiving surface of a CCD image sensor shown in FIG. 2.

According to the embodiment, the two-color radiation thermometer is provided with an image pickup unit 1 including a CCD image sensor 10 for receiving light radiated from a measuring object; a CCD driving unit 2 for sending various types of control signals to the CCD image sensor 10; an A/D conversion unit 3 for converting a pixel signal read out from the CCD image sensor 10 to a digital signal; an image signal processing unit 4 for dividing the digitized pixel signal into images corresponding to two wavelengths $\lambda 1$ and $\lambda 2$, and for performing a predetermined signal processing as needed; and a temperature calculation unit 5 for calculating a two-dimensional temperature distribution information of the measuring object based on the two image signals. A temperature may be calculated from the image signals corresponding to the two wavelengths $\lambda 1$ and $\lambda 2$ with conventional algorithm.

One of features of the present embodiment is a light path structure in the image pickup unit 1. More specifically, as shown in FIG. 2, a light blocking plate 13 and a prism 14 having a wavelength selective function are disposed between an incident lens system 12 for conversing incident light and the CCD image sensor 10. The prism 14 is provided with a $\lambda 1$-wavelength selective transmitting filter 15 for selectively transmitting light with the wavelength $\lambda 1$ on an incident surface with a 45° angle relative the incident light, and a $\lambda 2$-wavelength selective reflective filter 16 for selectively reflecting light with the wavelength $\lambda 2$ (transmitting light with a wavelength other than the wavelength $\lambda 2$) on an exit surface 180° opposite to the incident surface.

A $\lambda 1$-wavelength selective transmitting filter 17 for selectively transmitting light with the wavelength $\lambda 1$ is attached to the left half of the light receiving surface of the CCD image sensor 10, and a $\lambda 2$-wavelength selective transmitting filter 18 for selectively transmitting light with the wavelength $\lambda 2$ is attached to the right half of the light receiving surface of the CDD image sensor 10. The set of selective transmitting filters 17 and 18 described in the present embodiment is an example of a wave limitation device as recited in the claims.

As shown in FIG. 3, the CCD image sensor 10 has a two-dimensional light receiving surface 10a imaginarily divided into right and left halves relative to a substantial center. A light receiving area 10L for receiving light with the wavelength $\lambda 1$ is positioned on the left half surface, and a light receiving area 10R for receiving light with the wavelength $\lambda 2$ is positioned on the right half surface. That is, in the two-color radiation thermometer, identical images corresponding to the two wavelengths of $\lambda 1$ and $\lambda 2$ are formed at positions not overlapped on the two-dimensional light receiving surface 10a of the exclusive CCD image sensor 10.

An operation of measuring a radiation temperature using the two-color radiation thermometer will be explained next. The incident lens system 12 converses light L1 with the wavelengths $\lambda 1$ and $\lambda 2$ radiated from the measuring object 11. The light blocking plate 13 collimates the light L1, and the light L1 enters the prism 14. In the light L1, only light L2 with the wavelength $\lambda 1$ transmits through the $\lambda 1$-wavelength selective transmitting filter 15. When the light L2 transmits through the $\lambda 1$-wavelength selective transmitting filter 17 attached to the front face of the CCD image sensor 10, light with a wavelength other than the wavelength $\lambda 1$ is further attenuated, and the light L2 reaches the $\lambda 1$-light receiving area 10L on the two-dimensional light receiving surface 10a.

At the same time, in the light L1 entering the prism 14, light with a wavelength other than the wavelength $\lambda 1$ is reflected at the $\lambda 1$-wavelength selective transmitting filter 15 at a roughly right angle, and incidents on the $\lambda 2$-wavelength selective reflective filter 16. At this point, light L3 with the wavelength $\lambda 2$ is reflected at a roughly right angle and comes out from the prism 14. When the light L3 transmits through the $\lambda 2$-wavelength selective transmitting filter 18 attached on the front face of the CCD image sensor 10, light with a wavelength other than the wavelength $\lambda 2$ is further attenuated, and the light L3 reaches the $\lambda 2$-light receiving area 10R on the two-dimensional light receiving surface 10a. In an actual arrangement, the prism 14 and other components are arranged such that the light paths of the light L2 and L3 have a same length.

In the constitution described above, the prism 14 creates two images of the original image on the two-dimensional light receiving surface 10a of the CCD image sensor 10. The filters 15 and 16 provided on the prism 14 select the wavelengths $\lambda 1$ and $\lambda 2$. The wavelength selective transmitting filters 17 and 18 attached on the front face of the two-dimensional light receiving surface 10a enhance purity of the wavelength through providing additional wavelength selective function. In this constitution, the $\lambda 1$-light receiving area 10L is located close to the $\lambda 2$-light receiving area 10R, so that a cross talk due to stray light and the like at the prism 14 may be an issue. The wavelength selective transmitting filters 17 and 18 are disposed adjacent to the light receiving surface 10a to prevent the cross talk. It is not necessary to attach the wavelength selective transmitting filters 17 and 18 to the light receiving surface 10a. It is. preferable to provide the wavelength selective transmitting filters 17 and 18 close to the light receiving surface 10a as possible.

As described above, the $\lambda 1$-light receiving area 10L of the CCD image sensor 10 accumulates charge signals corresponding to the image of the measuring object 11 with only the $\lambda 1$-wavelength component, and the $\lambda 2$-light receiving area 10R of the CCD image sensor 10 accumulates charge signals corresponding to the image of the measuring object 11 with only the $\lambda 2$-wavelength component. After the charge signals are accumulated for a predetermined period of time, the CCD driving unit 2 inputs a predetermined control signal into the CCD image sensor 10, and the pixel signals are sequentially read out from a large number of pixels constituting the two-dimensional light receiving surface 10a. The analogue pixel signals are converted to digital signals at the A/D conversion unit 3. The digital signals are divided into pixel signals corresponding to the $\lambda 1$-light receiving area 10L and pixel signals corresponding to the $\lambda 2$-light receiving area 10R at the image signal processing unit 4. The temperature calculation unit 5 calculates a temperature at every each small position of the measuring object 11 based on the $\lambda 1$-corresponding image signal and the $\lambda 2$-corresponding image signal, and creates a temperature distribution image as temperature distribution information. The image can be displayed, for example, on the screen.

In the constitution described above, when the measuring wavelengths λ1 and λ2 are changed, the prism 14 with the wavelength selective function and the wavelength selective transmitting filters 17 and 18 attached to the two-dimensional light receiving surface 10a of the CCD image sensor 10 are changed.

A two-color radiation thermometer according to another embodiment of the present invention will be explained next with reference to FIG. 4. In the embodiment described above, the prism is provided for forming the two images of the measuring object. In the present embodiment, a polarizing beam splitter is provided in place of the prism. As shown in FIG. 4, a polarizing beam splitter 24 is provided with a P-wave selective transmitting filter 25 on an incident surface thereof and a S-wave selective transmitting filter 26 on an exit surface thereof. Also, a P-wave selective transmitting filter 19 is provided on a front surface of the λ1-wavelength selective transmitting filter 17, and a S-wave selective transmitting filter 20 is provided on a front surface of the λ2-wavelength selective transmitting filter 18.

The light L1 with the wavelengths λ1 and λ2 radiated from the measuring object 11 is conversed at the incident lens system 12, collimated by the light blocking plate 13, and enters the polarizing beam splitter 24. In the light L1, light Lp with a P-wave component transmits through the P-wave selective transmitting filter 25. When the light Lp transmits through the P-wave selective transmitting filter 19 attached on the front face of the CCD image sensor 10, the light L1 with the S-wave component is further attenuated. When the light Lp transmits through the λ1-wavelength selective transmitting filter 17, light with a wavelength other than the wavelength λ1 is further attenuated, and the light Lp reaches the λ1-light receiving area 10L on the two-dimensional light receiving surface 10a.

At the same time, in the light L1 entering the polarizing beam splitter 24, light with a component other than the P-wave component, i.e. light with the S-wave component, is reflected at the P-wave selective transmitting filter 25 at a roughly right angle, and enters the S-wave selective reflective filter 26. At this point, light with the S-wave component is reflected at a roughly right angle and comes out from the polarizing beam splitter 24. When light with the S-wave component transmits through the S-wave selective transmitting filter 20 attached on the front face of. the CCD image sensor 10, light with a component other than the S-wave component is further attenuated. When light with the S-wave component transmits through the λ2-wavelength selective transmitting filter 18, light with a wavelength other than the wavelength λ2 is further attenuated, and light reaches the λ2-light receiving area 10R on the two-dimensional light receiving surface 10a.

Accordingly, in this embodiment, the polarizing beam splitter 24 corresponds to the light diverging means, and the wavelength selective transmitting filters 17 and 18 correspond to the wavelength limitation means. The P-wave selective transmitting filter 19 and the S-wave selective transmitting filter 20 support the polarizing beam splitter 24 to divert light.

In the constitution of the embodiment, the image of the λ1-wavelength light and the image of the λ2-wavelength light are formed at the λ1-light receiving area 10L and the λ2-light receiving area 10R on the two-dimensional light receiving surface 10a of the CCD image sensor 10. In this embodiment, only the wavelength selective transmitting filters 17 and 18 may be replaced when the measuring wavelengths λ1 and λ2 are changed, thereby making the embodiment advantageous.

Figure 5:
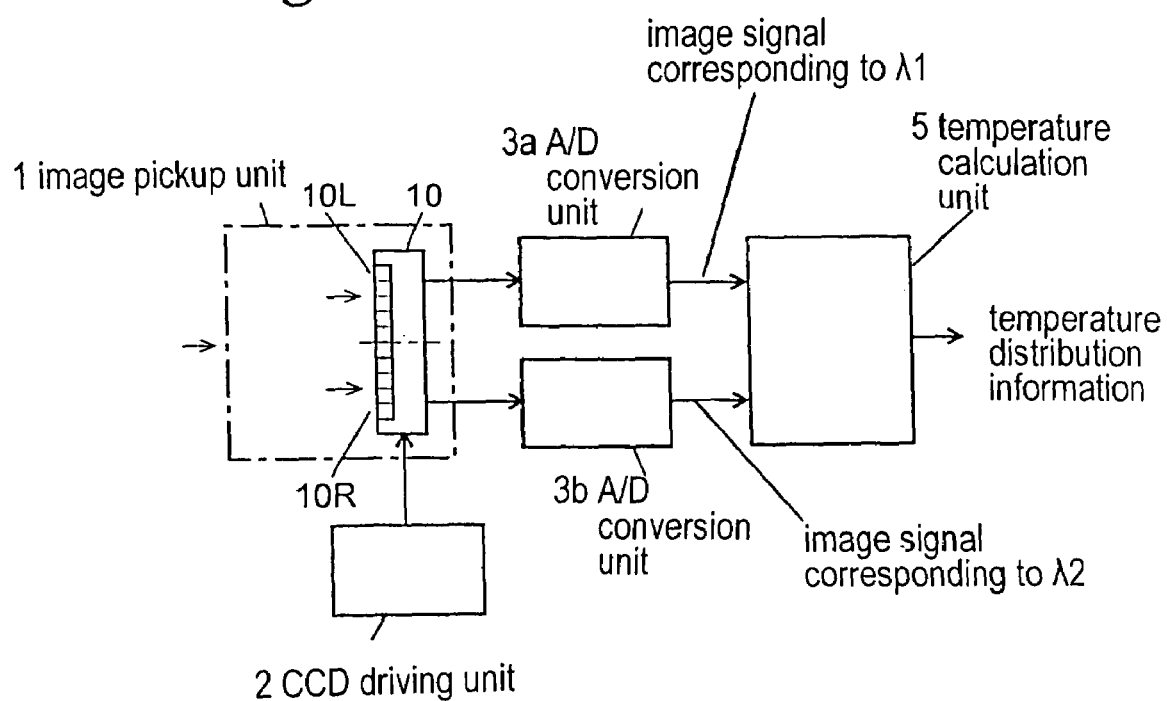
FIG. 5 is a diagram showing an overall structure of the two-color radiation thermometer of a further embodiment of the present invention.

In the embodiments described above, the solid-state image sensing device (CCD image sensor or CMOS image sensor) sequentially reads out the pixel signals via a single system output signal line. When a solid-state image sensing device can read out the pixel signals in parallel via a double system output signal line, it is possible to provide a constitution shown in FIG. 5.

The pixel signals read out from the λ1 light receiving area 10L are digitized at the A/D conversion unit 3a, and the pixel signals read out from the λ2 light receiving area 10R are digitized at the A/D conversion unit 3b. The pixel signals corresponding to the two images are separated when the pixel signals are read out from the CCD image sensor 10. Accordingly, it is not necessary to perform the process of separating the image signals. When the pixel signals are read out from the CCD image sensor 10, the two pixel signals corresponding to identical positions of the original image are simultaneously read out in parallel. As a result, it is possible to perform the process of, for example, calculating a difference of the pixel signals at the temperature calculation unit 5 at a high speed. Therefore, as compared with the embodiments described above, it is possible to calculate the temperature distribution at a higher speed.

The above-mentioned embodiments are just examples, and can be modified within the scope of the present invention.

While the invention has been explained with reference to the specific embodiments of the invention, the explanation is illustrative and the invention is limited only by the appended claims.

What is claimed is:
1. A two-color radiation thermometer for measuring a temperature of an object, comprising:
only one image pickup device having a light receiving surface with a plurality of micro photo receiving elements arranged two-dimensionally, said light receiving surface having a first area and a second area, wherein said only one image pickup device is one CCD image sensor,
light diverging means for selecting a first spectrum and a second spectrum, and guiding light radiated from the object in the first spectrum toward the first area, and guiding light radiated from the object in the second spectrum toward the second area,
a wavelength limitation device formed at a front side of the image pickup device for selecting first and second wavelengths of the light irradiated on the first area and the second area, and
temperature calculation means electrically connected to the image pickup device, said temperature calculation means receiving a first image signal corresponding to the first wavelength from the micro photo receiving elements located in the first area and a second image signal corresponding to the second wavelength from the micro photo receiving elements located in the second area, and calculating the temperature of the object based on the first and second image signals.
2. A two-color radiation thermometer according to claim 1, wherein said light diverging means is a prism.
3. A two-color radiation thermometer according to claim 1, wherein said light diverging means includes a first polarizing beam splitter for guiding the light with a first polarized light wave toward the first area and a second polarizing beam splitter for guiding the light with a second polarized light wave toward the second area.

4. A two-color radiation thermometer according to claim 3, wherein said wavelength limitation device further includes a first wavelength filter for guiding the first polarized light toward the first area and a second wavelength filter for guiding the second polarized light toward the second area.

* * * * *